Figure 3:
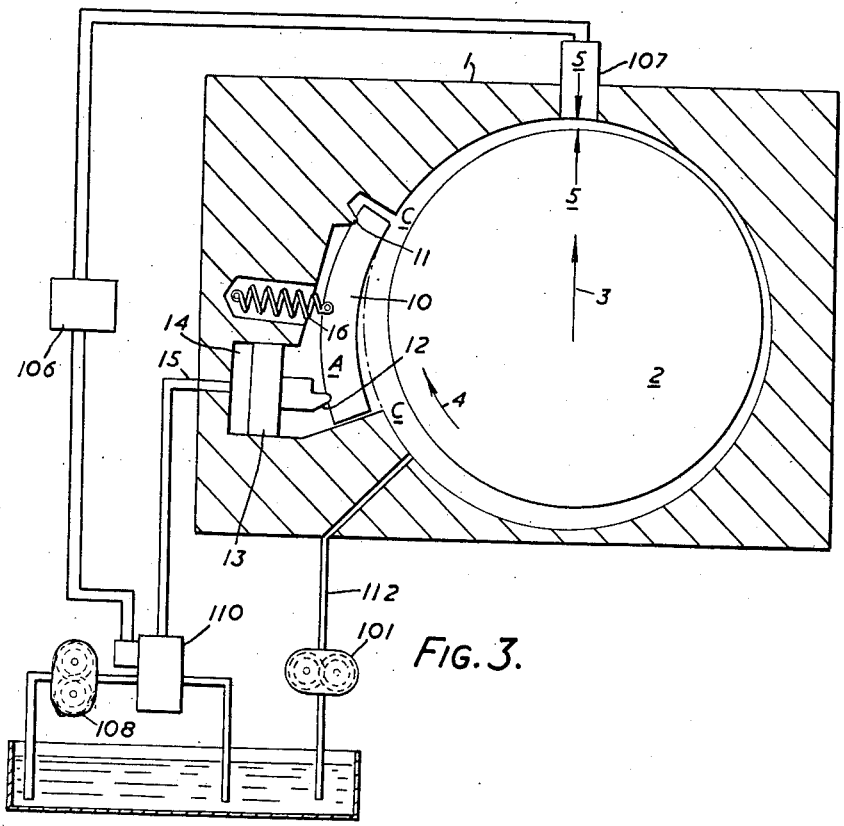

Aug. 27, 1963
P. P. LOVE
3,101,980
HYDRODYNAMIC BEARING ASSEMBLY
Filed Sept. 27, 1961
2 Sheets-Sheet 1
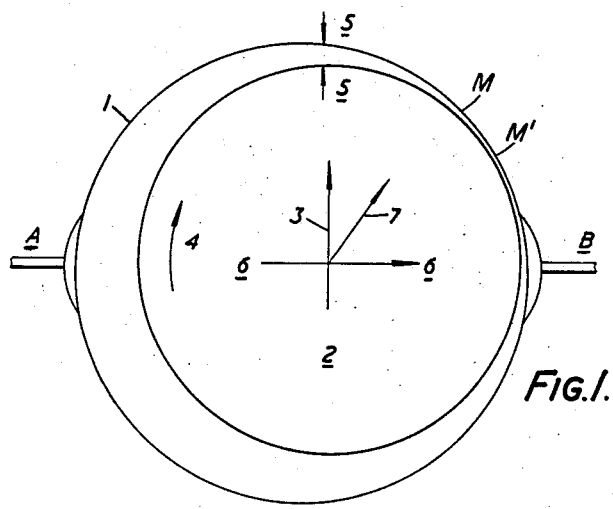
FIG.1.
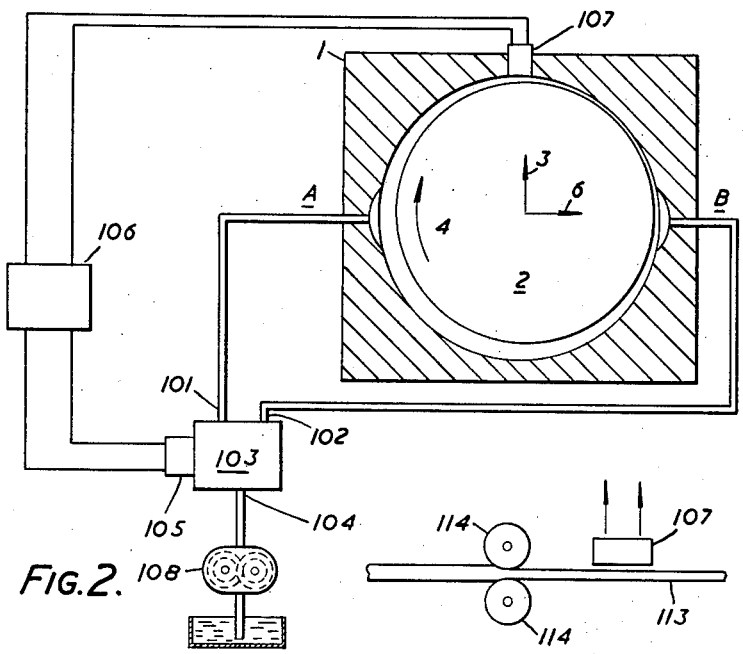
FIG.2.
FIG.5.
INVENTOR
PHIL P. LOVE
BY
Pierce, Scheffler & Parker
ATTORNEYS Aug. 27, 1963   P. P. LOVE   3,101,980
HYDRODYNAMIC BEARING ASSEMBLY
Filed Sept. 27, 1961   2 Sheets-Sheet 2

INVENTOR
PHIL P. LOVE

BY
Pierce, Scheffler & Parker
ATTORNEYS 3,101,980
HYDRODYNAMIC BEARING ASSEMBLY
Phil Prince Love, Wembley, England, assignor to The Glacier Metal Company Limited, Wembley, England, a company of Great Britain
Filed Sept. 27, 1961, Ser. No. 141,168
Claims priority, application Great Britain Oct. 6, 1960
11 Claims. (Cl. 308—122)

The present invention relates to hydrodynamic bearing assemblies of the kind including a journal positioned within a sleeve bearing and arranged for a rotation relatively to the sleeve bearing, and in which a lubricant is provided between the adjacent surfaces of the journal and sleeve bearing. By "sleeve bearing" is meant a plain bearing having a surface of approximately circular cross-section when considered perpendicularly to the longitudinal axis of the bearing and is therefore such as to include for example bearings of the right circular cylindrical kind of the conical or double conical kinds and spiral bearings of the type described, for example, in the present applicant's British Patent No. 877,233.

A hydrodynamic bearing may be defined as one in which the bearing load is supported by oil pressures generated within the oil film by rotation in the bearing. Usually the pressure is generated as a result of the shaft moving into an eccentric position under load, thus forming a converging oil film or oil wedge over one half of the bearing, and a diverging oil film over the other half.

In a hydrostatic bearing by contrast, the bearing load is supported by oil pressure obtained from an external source, and the shaft is maintained in a central position in the bearing.

According to the invention a bearing assembly comprises a journal subject to a main load and supported in a plain sleeve bearing and controllable means capable of applying to the journal a load (the auxiliary load) in a direction having a substantial radial component acting at right angles to the direction of action to the main load.

The invention has particular application in cases where accurate control of the clearance space between the bearing surfaces of the journal and the plain bearing (hereinafter referred to as the clearance space) in a given direction radially of the longitudinal axis of the sleeve bearing, since by application of the auxiliary load upon the journal or a variation in the magnitude of the said radial component, an adjustment in the position of the journal in the bearing radially of the bearing axis can be effected and thus, by proper control of the auxiliary load applied to the journal, the clearance space in direction radially of the bearing axis can be controlled.

Requirements for control of the clearance space in a bearing assembly are met, for example, in bearing assemblies for supporting a grinding head of a high accuracy grinding machine or for supporting a roll of a rolling mill. In such cases it is generally desired that the spacing be controlled so as to be maintained substantially constant or within determined limits in that direction radially of the journal in which the journal is being urged by the load borne by it (that is to say, in the direction of action of the main load).

The controllable means for applying the auxiliary load may comprise one or more adjustable load applying means, each load applying means being capable of applying a load to the journal in a direction such that the load applied by it has a substantial component radially of the bearing axis at right angles to the direction of action of the main load, but in one particular form of the invention the means for applying the auxiliary load comprises two controllable load applying means effective respectively to apply to the journal radial loads having substantial components in opposite directions at right angles to the main load so that an auxiliary load can be applied in either direction on application of appropriate control. Preferably there is included control means effective to control the load applying means so that an increase in the load applied by one of the load applying means is accompanied by a simultaneous decrease in the load applied by the other. Such control may be arranged to be varied either progressively or in incremental steps.

The auxiliary load may be applied either wholly or in part by means of fluid delivered under pressure into a part of the clearance space through one or more recesses, grooves or channels formed at appropriate positions in the bearing surface of the plain bearing, such fluid conveniently also acting to lubricate the bearing surfaces. Usually such fluid is the same as that provided between the bearing surfaces for lubricating purposes and thus acts to supplement the supply of lubricating fluid delivered to the bearings. In some cases the fluid used to provide the auxiliary load may alone be relied upon to lubricate the bearing surfaces. For the purpose of the present specification, such fluid will be referred to as lubricating oil.

Alternatively, the auxiliary load may be applied to the journal as a result of pressure hydrodynamically developed in the lubricating fluid or oil lying in a part of the clearance space between the bearing surfaces which pressure being capable of being controlled by movement of at least one moveable element arranged to vary the hydro-dynamic conditions in such part.

Such a moveable element may comprise a portion of the bearing surface of the plain bearing lying adjacent said part of the clearance space and arranged to be adjustable about an axis generally parallel with the longitudinal axis of the bearing through a range of settings within which the thickness of the oil film lying between the said portion and the journal measured radially from the bearing axis progressively decreases along the circumferential length of the portion, the rate of decrease in the thickness along said length being dependent upon the setting of the portion about the axis. In use the direction of rotation of the journal relatively to the sleeve bearing should be such that a point upon the journal surface moves relatively to the sleeve bearing in the direction in which the clearance between the moveable portion and the journal bearing surface progressively decreases.

Such a portion may be hinged along one edge to an adjacent fixed portion of the bearing surface for movement about an axis parallel with the longitudinal axis of the bearing, or may be a portion which is discontinuous from the adjacent portions of the bearing surface, and pivotable about an axis adjacent the downstream edge of the adjustable portion parallel with the longitudinal axis of the bearing.

By downstream is meant that axial extending edge of the adjustable portion which is traversed last by a point on the journal bearing surface during rotation of the journal, during the traversal of that point over the adjustable portion.

Such an adjustable portion may for example be adjusted under the control of lubricating fluid.

In a preferred arrangement, there is arranged in combination with a bearing assembly according to the invention a sensing device responsive either directly or indirectly to changes in the clearance between the bearing surfaces considered radially of the bearing axis in the direction of action of the main load and capable of providing a signal dependent upon clearance, the controllable means being responsive to a signal from the sensing device to vary the auxiliary load in a manner tending to maintain the clearance at a determined value or within a determined range.

The sensing device may be one of a number of devices known for providing a signal which varies with changes in the thickness of the oil lying between the bearing surfaces of a bearing (i.e. the clearance space and journal) and may for example, consist of a capacity probe, a device carried on the sleeve bearing and of which the electromagnetic inductions varies with variation in the clearance between the sleeve bearing and the journal in the given direction, or computer means providing an output signal dependent upon the speed of rotation of the journal, the magnitude of the load and the temperature or viscosity of the oil lying in the clearance space.

Figure 4:
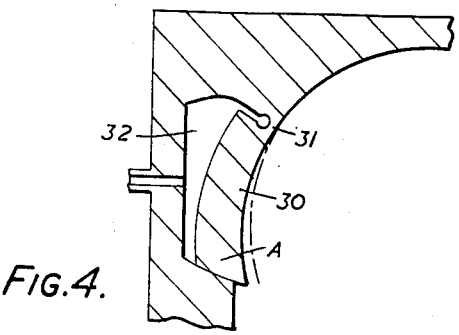

Various embodiments of the invention, in combination with a sensing device arranged to automatically control the controllable means to maintain the clearance space between surfaces of the sleeve bearing and journal in a given direction radially of the bearing axis, will now be described by way of example, with reference to the accompanying drawings in which:

FIGURE 1 is a vertical section of a bearing assembly embodying the invention to which reference is made below for the purpose of explaining changes which occur in the relative positions of the journal and sleeve bearing with changes in the auxiliary load, FIGURE 2 is a schematic diagram of one form of bearing assembly according to the invention in combination with a sensing device and control means capable to maintain the clearance between the journal and outer bearing considered in the direction of action of the load upon the bearing assembly at a determined value, FIGURE 3 is a schematic diagram showing an alternative form of bearing assembly embodied in an arrangement generally similar to that of FIGURE 2, FIGURE 4 shows a fragmentary section of a form of an adjustable portion alternative to that of the arrangements of FIGURES 2 and 3 and, FIGURE 5 illustrates schematically an arrangement in which a measure of the clearance between the journal and sleeve bearing surfaces is obtained indirectly from a measure of the thickness of strip rolled in a strip rolling mill having one of the rolls supported by bearing assemblies according to the present invention.

In the diagram of FIGURE 1, a plain sleeve bearing 1 of a hydrodynamic bearing assembly has lying with it a journal 2 of which the position in the sleeve bearing is to be controlled, which journal being one of two journals supporting a roll of a strip rolling mill. It will be understood that the other journal of the roll comprises part of a similar bearing assembly identical with that diagrammatically shown in FIGURE 1 and which operates in an identical manner. As the two assemblies are identical one only will now be described.

For the purpose of example only, it is to be considered that the positioning of the journal is to be controlled such that, in a direction radial of the bearing axis (the given direction) shown by the arrow 3, the spacing between the bearing surfaces of the plain bearing and the journal is to be maintained at a determined value (that is to say the thickness 5—5 of the oil film lying between the bearing surfaces of the bearing and the journal considered in the direction 3 is to be maintained substantially constant), and that the direction 3 is in the direction of action of the load borne by the journal. It will be understood that in FIGURE 1 the clearance space between the bearing surfaces of the bearing and the journal is exaggerated for the purpose of clear illustration of the eccentric position taken up by the journal during operation within the bearing and when in the equilibrium condition, and that the invention is not limited to cases in which the given direction lies in the direction of action of the load as illustrated by way of example.

In the equilibrium condition, when the journal is being rotated in the bearing, the position M at which the oil film between the bearing surfaces of the journal and the bearing is at a minimum when measured radially of the journal is found located at a point displaced circumferentially around the journal bearing surface in the direction of rotation of the journal (shown by the arrow 4) from that part 5—5 of the oil film which lies radially of the journal axis in the direction of action of the load borne by the bearing.

The amount of displacement between the position M and the point 5—5 is dependent upon a number of factors such as the load carried by the journal, the speed of rotation of the journal, and so on. On change of one or more of these factors occurring, an alteration in the equilibrium conditions occurs, and, in general a shift of the journal in the bearing takes place until a new equilibrium position of the journal in the bearing is reached with the position M at a new location. Such a shift will in most cases result in a change in the spacing between the bearing surfaces of the journal and bearing in the given direction.

On a change occurring in the clearance space and thus in the thickness of the oil film at 5—5 due, for example, to one of the factors mentioned above, a sensing device is arranged to provide to controllable means comprising or including load applying means, a signal which is dependent upon the thickness of the oil film 5—5. Conveniently the sensing device is arranged to obtain a direct measure of the spacing at 5—5, but alternatively, of course, may be positioned at any suitable position around the sleeve bearing surface at which a measure of the clearance between the journal and sleeve bearing surfaces can be obtained and from which a measure of the spacing at 5—5 can be derived. For example the sensing device may be arranged to obtain a measure of the spacing at a point diametrically opposite to 5—5. The controllable means, in response to the signal, is arranged to apply an auxiliary radial load to the journal to adjust the position of the journal in the bearing and so regulate the thickness of the oil film in the given direction.

The magnitude of the auxiliary load (which is dependent upon the variation in the signal from the sensing device) and the direction of action of the auxiliary load (which is preferably at right angles to the given direction 3 along the line 6—6) are together arranged to be such that the position of the journal within the bearing is adjusted so as to regulate the thickness of the oil film at 5—5 in a manner such as to maintain the thickness at a substantially constant value.

In the case where a decrease occurs in the thickness of the oil film at 5—5, the auxiliary load is supplied to the journal along the line 6—6 in the direction of the arrow. The direction of action of the combined load 7 on the journal 2, that is to say the direction of action of the resultant load on the journal due to the auxiliary load and the externally applied load, will thus lie angularly displaced about the journal axis in the direction of rotation of the journal from the direction of action 3 of the auxiliary applied load alone, and thus cause a circumferential shift in the position of the minimum thickness of oil film in the direction of rotation of the journal to a new position $M^1$ and thus a corresponding increase in the thickness of the oil film at 5—5. The minimum thickness of the oil film when at $M^1$ will of course, be somewhat smaller than the minimum thickness when at M, but by appropriate choice of the magnitude of the auxiliary load, the amount of circumferential shift in the position of minimum oil thickness will be such as to restore the thickness of the oil film at 5—5 to the determined value.

In the case where an increase occurs in the thickness of the oil film at 5—5, the auxiliary load will, if already present, be decreased or its direction reversed, or, if not present at the time of the increase in the oil film thickness, be applied along the line 6—6 in the opposite direction to that shown by the arrow. Thus a circumferential shift of the position of minimum oil thickness is caused in the opposite direction to the direction of rotation of the journal and thus a decrease in the thickness of the oil film at 5—5. The magnitude of the applied load again being such as to restore the thickness of the oil film at 5—5 to the determined value.

The auxiliary load may be applied to the journal through a load applying means which exerts a load on the journal at a single position circumferentially displaced in the appropriate direction from 5—5 through 90° (at A or B). Preferably, however, the bearing assembly is provided with one or more load applying means arranged to apply loads on the journal at two positions respectively displaced in opposite circumferential directions from 5—5 through 90°, and the magnitude of the loads applied at the two positions are differentially controlled so as to apply to the journal a single resultant load of the desired magnitude.

Thus, in the bearing assembly shown in FIGURE 2, such bearing assembly supporting the upper roll of a strip rolling mill, the auxiliary load is applied to the journal by means of lubricating oil admitted under pressure in the clearance space through grooves or recesses A, B formed in the bearing surface of the sleeve bearing. Two grooves or recesses (or two groups of grooves or recesses) are located in the bearing surface at diametrically opposite positions (A, B) each displaced in opposite directions from 5—5 through 90°. Oil is delivered to each groove (or group of grooves) from respective output passages 101, 102 of an electrically controlled, shuttle oil distributing valve 103. The two output delivery passages respectively receive oil from the input passage 104 of the valve at pressures which vary in mutually opposite senses with changes in the setting of the valve, the setting being varied by an electromagnetic control mechanism 105 arranged to adjust the position of the valve shuttle relative to the valve body and against a spring (not shown) in response to electric signals received thereby after amplification by an amplifier 106, from a sensing device 107 of the electric inductive type located at 5—5. Oil from a reservoir is delivered to the distributing valve 103, at pressure, by a high pressure gear pump 108 driven by a motor (not shown), and the oil delivered to the clearance space from the valve through the grooves or recesses A, B, as well as applying the auxiliary load, serves to lubricate the bearing surfaces. It should be appreciated that the figure illustrates one only of the bearing assemblies supporting the upper roll of the strip rolling mill and that two substantial identical bearing assemblies are utilized, there being one adjacent each end of the roll.

In the embodiment of the invention shown in FIGURE 3, a load applying means is arranged to apply an auxiliary load upon the journal at a single position circumferentially displaced from 5—5 through 90° in a direction opposite to the direction 4 in which the journal is arranged to be rotated in the bearing, the auxiliary load being applied by means of hydraulic pressure developed in the oil lying between the bearing surface of the sleeve bearing and the journal. The load applying means includes a portion 10 of the bearing surface of the sleeve bearing which is discontinuous with the adjacent parts of the bearing surface and pivotable around an axis 11 generally parallel with the longitudinal axis of the bearing. When in use, the portion is so positioned about its pivot 11 that the thickness of the oil film lying between it and the journal when measured radially from the bearing axis, progressively decreases in the direction of rotation 4, of the journal 2 so that during rotation of the journal a hydrostatic pressure is built up in the oil. The angular setting of the portion about its pivot axis 11 is controlled in accordance with signals from a sensing device 107 similar to that of the arrangement of FIGURE 3 by adjustment of the position of a stop 12 against which the portion bears and which is carried by a piston 13 located within a cylindrical cavity 14 formed in the bearing backing block.

Adjustment of the position of the piston in the cavity and therefore of the stop is effected by lubricating oil delivered to the cylindrical cavity 14 via a conduit 15 from a pressure regulator 110 the setting of which is controlled by amplified signals delivered to it from the sensing device. The pressure regulator 110 is arranged to receive oil at pressure from a high pressure gear pump 108 driven by a motor (not shown). During operation an auxiliary load is applied to the journal at all times the magnitude of the load being increased or decreased with variation in the thickness of the clearance at 5—5. To ensure that the clearance space is filled by lubricating oil at all times a supply of oil is delivered to the clearance space from a low pressure gear pump 111 through an oil duct 112 passing through the bearing surface of the outer bearing at a position upstream of the portion 10. Lubricating oil seeping past the piston 13 also serves to lubricate the bearing surfaces.

The portion 10 is drawn around its pivot 11 and into contact with the stop 12 by a spring 16 extending between it and the block. The relative positions of the pivot 11 and the stop 12 are such that the downstream edge of the adjustable portion 10 lies substantially in the imaginary circumferential continuation C—C of the plain bearing surface extending across the region of the pivotal portion with its upstream edge displaced radially from the continuation C—C, so that there is formed a converging region in which hydrodynamically developed pressure is built up in the oil to apply a load upon the journal.

In a modification of arrangement of FIGURE 3, a load is applied by two load applying means, each similar to the single load applying means described above and each located at diametrically opposite positions so that the resultant of the two loads forms the auxiliary load. Each load is applied by appropriate positioning of a pivotable portion of the bearing surface of the sleeve bearing adjustable under the action of a hydraulically controlled piston in the manner described with reference to FIGURE 3. Suitable oil ducts are provided to deliver oil into the clearance space at positions upstream of each load applying means in order to ensure that these parts of the clearance space adjacent the portions 10 are always filled with oil.

In a variation of the arrangement illustrated in FIGURE 3 and the modification thereof described above, the adjustable portion is such as to be continuous with the adjacent surface of bearing, the portion 30 being hinged thereto along its downstream edge (as shown in FIGURE 4) by a flexible joining part 31 between it and the adjacent bearing surface for angular movement about an axis parallel with the bearing axis. Control of the angular setting of the portion about this hinge is effected by lubricating oil from a pressure regulating valve passed into and out of a cavity 32 formed in the bearing block behind the hinged portion in dependence upon the signal from the sensing device, the hinged portion forming one wall of the cavity with its edges other than that at the hinge making a substantially fluid-tight seal with the adjacent bearing surface.

In the above described embodiments, the clearance between the bearing surface is measured directly. This, of course, is not essential and applications of the invention to rolling mills, for example, the sensing device 107 may be arranged as illustrated in FIGURE 5 to provide signals to the control means in response to changes in the thickness of the strip 113 passing between the rollers 114 since such changes are directly dependent upon changes in the clearances in the bearing assemblies supporting the rollers. In such an arrangement, the sensing device may consist, for example, of any one of the well-known forms of radiation gauge for providing a signal giving a measure of the thickness of the metal strip.

A bearing assembly of the present invention may also include means positioned in the bearing surface of the bearing generally at a point lying in the direction of the externally applied load for the purpose of uprating or derating the bearing. Such means may comprise, for example, one or more grooves or recesses which are in communication with a source of hydrostatic fluid for uprating the bearing, and/or with a relief valve for derating the bearing. In many cases however such means are not provided, the rating of a bearing being arranged to be that required for the particular application to which it is to be put. Such uprating or derating means may be controlled in accordance with a signal from the sensing means or from a device responsive to the speed of rotation of the journal, for example, so that the range through which control may be applied by the controlling device may be varied.

What I claim as my invention and desire to secure by Letters Patent is:

1. A hydrodynamic bearing assembly comprising a journal subject to a main load and supported in a sleeve bearing such that when rotating under load the journal is eccentric in the bearing and the induced hydrodynamic oil wedge supports the load, and controllable means capable of applying to the journal an auxiliary load in a direction having a substantial radial component acting at right angles to the direction of action of the main load.

2. A hydrodynamic bearing assembly as claimed in claim 1, wherein the controllable means for applying the auxiliary load is effective to apply to the journal another auxiliary radial load in the opposite direction from the said first mentioned auxiliary load.

3. A hydrodynamic bearing assembly as claimed in claim 1, wherein the controllable means for applying the auxiliary load comprises at least two adjustable load-applying means, each load-applying means being capable of applying a load to the journal in a direction such that the load applied by it has a substantial component at right angles to the direction of action of the main load.

4. A hydrodynamic bearing assembly as claimed in claim 3, wherein is included control means effective to control the load-applying means so that an increase in the load applied by one of the load-applying means is accompanied by a simultaneous decrease in the load applied by the other.

5. A hydrodynamic bearing assembly as claimed in claim 1, wherein the auxiliary load is applied by fluid delivered under pressure to at least one groove formed in the bearing surface of the sleeve bearing.

6. A hydrodynamic bearing assembly as claimed in claim 1, wherein at least a part of the auxiliary load is applied to the journal as a result of oil pressure hydrodynamically developed in oil lying in a part of the clearance space between the bearing surfaces of the journal and the sleeve bearing, and the oil pressure is capable of being controlled by movement of at least one movable element arranged to vary the hydrodynamic conditions in such part of the clearance space.

7. A hydrodynamic bearing assembly as claimed in claim 6, wherein the movable element comprises a portion of the bearing surface of the plain bearing lying adjacent said part of the clearance space and arranged to be adjustable about an axis generally parallel with the longitudinal axis of the bearing through a range of settings within which the thickness of the oil film lying between the said portion and the journal measured radially from the bearing axis progressively decreases along the circumferential length of the portion in the direction of rotation of the journal, the rate of decrease in the thickness along said length being dependent upon the setting of the portion about the axis.

8. The combination of a hydrodynamic bearing assembly as claimed in claim 1, and a sensing device responsive to changes in the clearance between the bearing surfaces considered radially of the bearing axis in a given direction and capable of providing a signal dependent upon the clearance, the controllable means being responsive to a signal from the sensing device to vary the auxiliary load in a manner tending to maintain the clearance within a determined range.

9. The combination as claimed in claim 8, wherein the sensing device comprises a capacity means of which the electromagnetic inductance varies with variation of the clearance.

10. The combination as claimed in claim 8, wherein the sensing device comprises means providing an output signal dependent upon the speed of rotation of the journal and magnitude of the main load.

11. The combination as claimed in claim 10, wherein the output signal is also dependent upon the viscosity of the oil lying in a clearance space between the bearing surfaces of the journal and plain bearing.

References Cited in the file of this patent

UNITED STATES PATENTS

| | | |
|---|---|---|
| 2,531,414 | Engvall | Nov. 28, 1950 |
| 2,879,113 | De Hart | Mar. 24, 1959 |
| 3,014,765 | Mottu | Dec. 26, 1961 |
| 3,017,773 | Flash et al. | Jan. 23, 1962 |
| 3,053,589 | Cameron | Sept. 11, 1962 |